(12) United States Patent
Savaria et al.

(10) Patent No.: US 11,300,007 B2
(45) Date of Patent: Apr. 12, 2022

(54) PLANETARY GEARBOX HAVING COMPLIANT JOURNAL BEARINGS

(71) Applicant: PRATT & WHITNEY CANADA CORP., Longueuil (CA)

(72) Inventors: Vincent Savaria, Laval (CA); Michel Desjardins, St-Hubert (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/861,871

(22) Filed: Apr. 29, 2020

(65) Prior Publication Data

US 2020/0263564 A1 Aug. 20, 2020

Related U.S. Application Data

(63) Continuation of application No. 16/196,447, filed on Nov. 20, 2018, now Pat. No. 10,683,773.
(Continued)

(51) Int. Cl.
*F01D 25/16* (2006.01)
*F02C 7/36* (2006.01)
(Continued)

(52) U.S. Cl.
CPC ......... *F01D 25/162* (2013.01); *F01D 25/166* (2013.01); *F02C 7/36* (2013.01);
(Continued)

(58) Field of Classification Search
USPC ......................................................... 475/342
See application file for complete search history.

(56) References Cited

U.S. PATENT DOCUMENTS 1,425,430 A * 8/1922 Wikander ............. F16H 1/2836
475/335
1,678,798 A * 7/1928 Asprooth ................. F16H 1/28
475/338
(Continued)

FOREIGN PATENT DOCUMENTS

EP 1435475 A2 7/2004
EP 2728140 5/2014
(Continued)

OTHER PUBLICATIONS

European Search Report dated Jun. 4, 2021, EP21164422.4.

*Primary Examiner* — Dirk Wright
(74) *Attorney, Agent, or Firm* — Norton Rose Fulbright Canada

(57) ABSTRACT

A planetary gear train for an aircraft engine, has: a sun gear; planet gear assemblies having main gears meshed with the sun gear, fore lateral gears and aft lateral gears disposed on opposite sides of the main gears and rotating therewith; journal bearings rotatably supporting the planet gear assemblies for rotation about rotation axes, gaps defined between the journal bearings and the planetary gear assemblies; a planet carrier supporting the journal bearings; a fore ring gear meshed with the fore lateral gears; an aft ring gear meshed with the aft lateral gears; and a lubrication system extending within the planet carrier and hydraulically connected to the gaps between the journal bearings and the planet gear assemblies.

19 Claims, 6 Drawing Sheets

Related U.S. Application Data

(60) Provisional application No. 62/676,614, filed on May 25, 2018.

(51) Int. Cl.
  *F16H 1/28* (2006.01)
  *F16H 57/04* (2010.01)
  *F16H 57/08* (2006.01)

(52) U.S. Cl.
  CPC ........... *F16H 1/28* (2013.01); *F16H 57/0479* (2013.01); *F16H 57/0486* (2013.01); *F16H 57/082* (2013.01); *F05D 2240/54* (2013.01); *F05D 2250/36* (2013.01); *F05D 2260/40311* (2013.01); *F05D 2260/98* (2013.01); *F16H 2057/085* (2013.01)

(56) References Cited

U.S. PATENT DOCUMENTS

| | | | |
|---|---|---|---|
| 3,307,433 A | | 3/1967 | Bennett et al. |
| 3,381,548 A | * | 5/1968 | Wolkenstein ............ F16H 55/14 475/338 |
| 4,325,589 A | * | 4/1982 | Hirt ..................... F16C 33/1075 384/375 |
| 5,033,997 A | * | 7/1991 | Thompson ................ F16H 1/28 475/332 |
| 5,102,379 A | | 4/1992 | Pagluica et al. |
| 5,310,391 A | * | 5/1994 | Takahashi ............. F16H 1/2809 475/338 |
| 5,391,125 A | | 2/1995 | Turra et al. |
| 6,223,616 B1 | * | 5/2001 | Sheridan ............. F16H 57/0482 74/468 |
| 6,964,155 B2 | | 11/2005 | McCune et al. |
| 8,574,118 B2 | * | 11/2013 | McCune ................... F02C 7/32 475/331 |
| 8,840,521 B2 | * | 9/2014 | Kari .................... F16C 33/1055 475/331 |
| 8,899,916 B2 | | 12/2014 | McCune et al. |
| 10,066,734 B2 | | 9/2018 | Sheridan |
| 10,107,333 B2 | * | 10/2018 | Kruhoffer ............... F16C 17/02 |
| 10,519,871 B2 | * | 12/2019 | Desjardins ................ F02C 7/36 |
| 10,948,071 B2 | * | 3/2021 | Meyer ................. F16H 57/0479 |
| 2016/0377166 A1 | | 12/2016 | Sheridan |
| 2018/0195601 A1 | | 7/2018 | Hallman |
| 2019/0048802 A1 | * | 2/2019 | Desjardins .......... F16H 57/0482 |
| 2020/0132186 A1 | * | 4/2020 | Dombek ............. F16H 57/0457 |

FOREIGN PATENT DOCUMENTS

| | | | | |
|---|---|---|---|---|
| EP | 3067588 A1 | * | 9/2016 | .............. B60K 6/48 |
| EP | 3109514 A2 | * | 12/2016 | ........... F16H 57/043 |
| EP | 3290751 A1 | * | 3/2018 | ......... F16H 57/0479 |
| EP | 3667126 A1 | * | 6/2020 | ............... F02C 7/36 |
| FR | 938913 A | | 10/1948 | |
| GB | 2256025 | | 11/1992 | |
| GB | 2452381 A | | 3/2009 | |
| JP | 07042817 A | * | 2/1995 | ......... F16H 57/0482 |
| JP | 2017032047 A | * | 2/2017 | ......... F16H 57/0479 |
| WO | 2015108709 | | 7/2015 | |
| WO | WO-2018197645 A1 | * | 11/2018 | ........... F16H 57/082 |
| WO | WO-2019074420 A1 | * | 4/2019 | ........... F16H 57/082 |

* cited by examiner

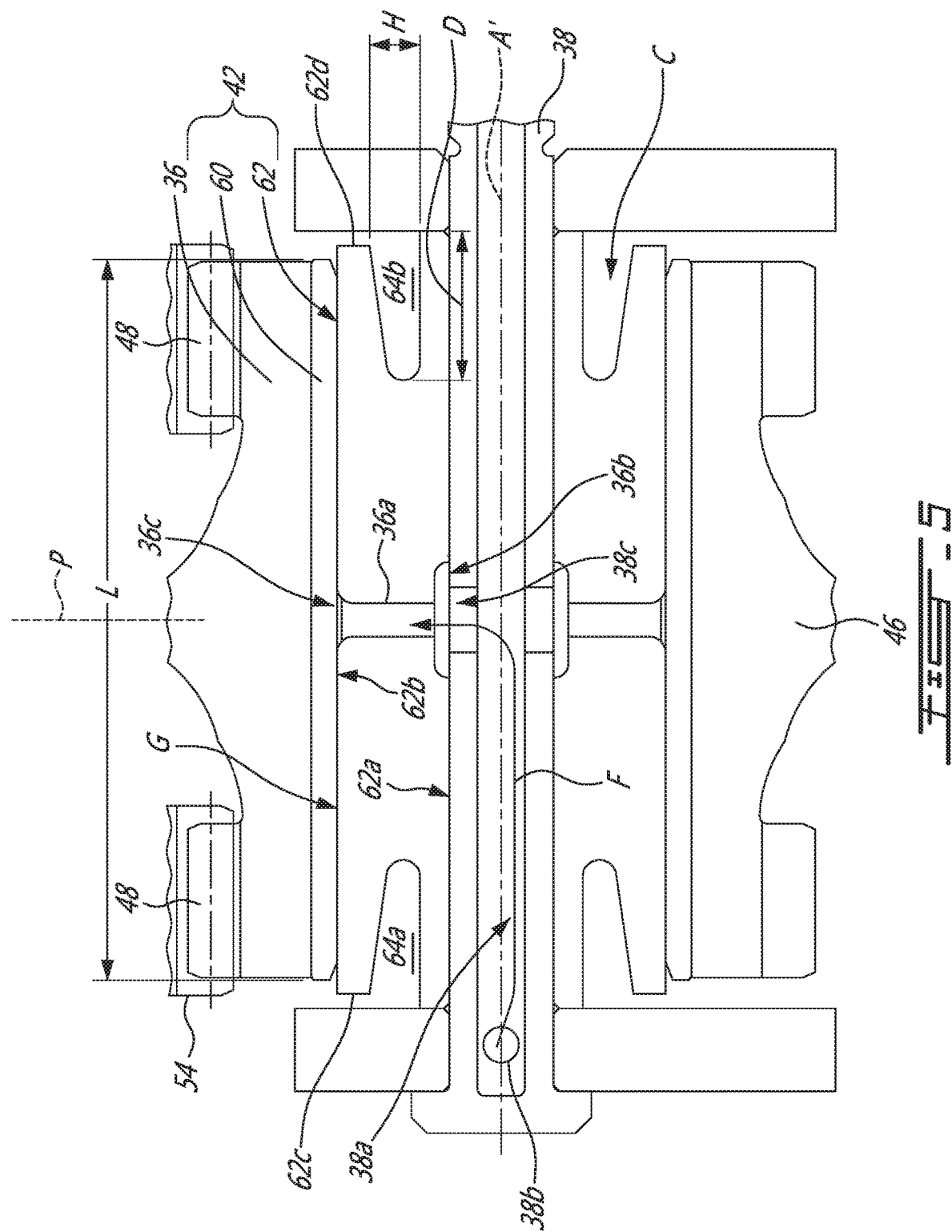

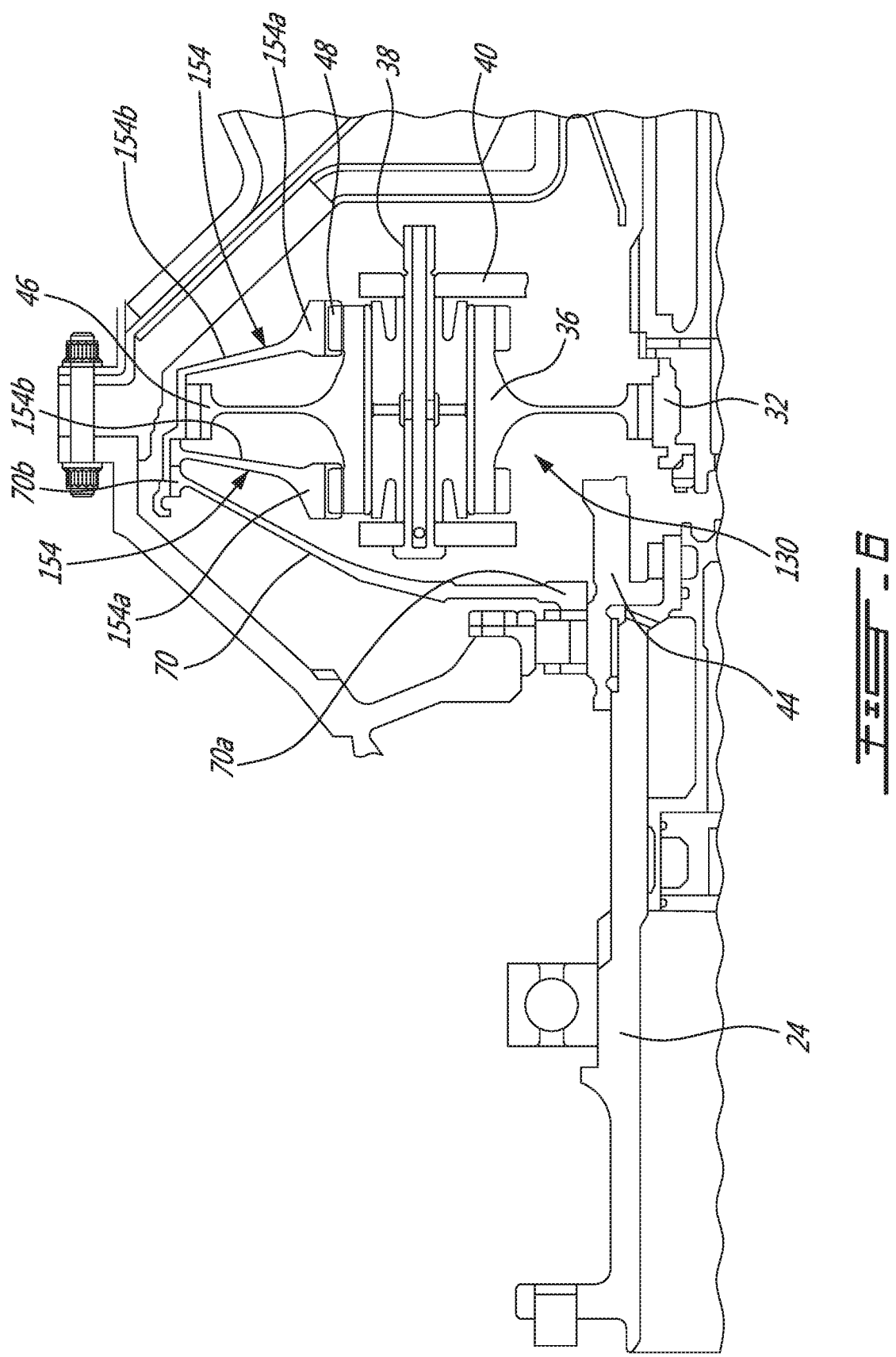

PLANETARY GEARBOX HAVING COMPLIANT JOURNAL BEARINGS

TECHNICAL FIELD

The application generally relates to aircraft engines and, more particularly, to gearboxes used in an aircraft engine such as a gas turbine engine.

BACKGROUND OF THE ART

Turboprops are gas turbine engines coupled to a propeller via a reduction gearbox. Turbofan engines may also use a gearbox to drive the fan at a different speed than the engine, and other gas turbine engine types may employ gearboxes to step up or step down speed over compressors. In the turboprop example, a reduction gearbox is used to reduce the rotational speed of the propeller relative to the turbine and to increase the torque generated by the turbine. In some gearboxes, in order to increase the power to weight ratio, bearings supporting the gears may have an increased length. The length of the bearings may cause the load to concentrate on extremities of the bearings.

SUMMARY

In one aspect, there is provided a planetary gear train for an aircraft engine, comprising: a sun gear; planet gear assemblies having main gears meshed with the sun gear, fore lateral gears and aft lateral gears disposed on opposite sides of the main gears and rotating therewith; journal bearings rotatably supporting the planet gear assemblies for rotation about rotation axes, gaps defined between the journal bearings and the planetary gear assemblies; a planet carrier supporting the journal bearings; a fore ring gear meshed with the fore lateral gears; an aft ring gear meshed with the aft lateral gears; and a lubrication system extending within the planet carrier and hydraulically connected to the gaps between the journal bearings and the planet gear assemblies.

In another aspect, there is provided an aircraft engine comprising a shaft drivingly engaged to a load via a planetary gear train, the planetary gear train having a sun gear, planet gear assemblies including main gears meshed with the sun gear, fore lateral gears and aft lateral gears disposed on opposite sides of the main gears and rotating therewith, journal bearings rotatably supporting the planet gear assemblies for rotation about rotation axes, gaps defined between the journal bearings and the planetary gear assemblies, a planet carrier supporting the journal bearings, a fore ring gear meshed with the fore lateral gears, an aft ring gear meshed with the aft lateral gears, the shaft drivingly engaged to one of the sun gear, the planet carrier, and the fore and aft ring gears, the load drivingly engaged to another one of the sun gear, the planet carrier, and the fore and aft ring gears, and rotation of a remaining one of the sun gear, the planet carrier, and the fore and aft ring gears being limited, the gaps between the journal bearings and the planet gear assemblies hydraulically connected to lubricant conduits of the planetary gear train.

DESCRIPTION OF THE DRAWINGS

Reference is now made to the accompanying figures in which:

FIG. 5 is a sectional view of a portion of FIG. 2; and

FIG. 6 is a schematic cross-sectional view of a gear train in accordance with another embodiment.

DETAILED DESCRIPTION

Figure 1:
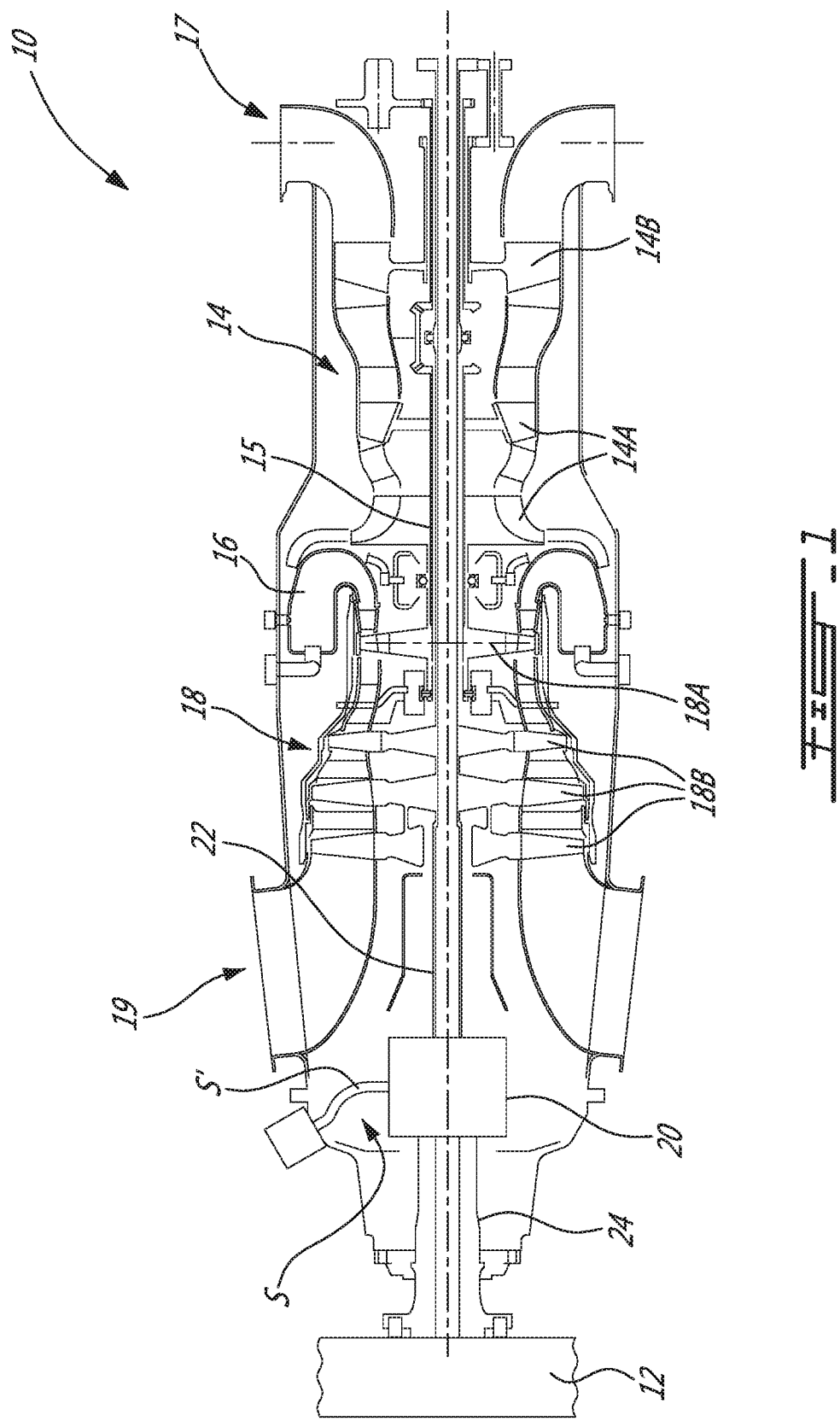
FIG. 1 is a schematic cross-sectional view of a gas turbine engine.

FIG. 1 illustrates a gas turbine engine 10 of a type preferably provided for use in subsonic flight and configured for driving a load 12, such as, but not limited to, a propeller or a helicopter rotor. Depending on the intended use, the engine 10 may be any suitable aircraft engine, and may be configured as a turboprop engine or a turboshaft engine. The gas turbine engine 10 generally comprises in serial flow communication a compressor section 14 for pressurizing the air, a combustor 16 in which the compressed air is mixed with fuel and ignited for generating an annular stream of hot combustion gases, and a turbine section 18 for extracting energy from the combustion gases.

The exemplary embodiment shown in FIG. 1 is a "reverse-flow" engine because gases flow from the inlet 17, at a rear portion of the engine 10, to the exhaust outlet 19, at a front portion of the engine 10. This is in contrast to "through-flow" gas turbine engines in which gases flow through the core of the engine from a front portion to a rear portion. The engine 10 may be a reverse-flow engine (as illustrated) or a through-flow engine.

In the illustrated embodiment, the turbine section 18 has a high-pressure turbine 18A in driving engagement with a high-pressure compressor 14A. The high-pressure turbine 18A and the high-pressure compressor 14A are mounted on a high-pressure shaft 15. The turbine 18 has a low-pressure turbine, also known as power turbine 18B configured to drive the load 12. The power turbine 18B is configured to drive a low-pressure compressor 14B through a low-pressure shaft 22. A reduction gearbox 20 is configured to connect the low-pressure shaft 22 that supports the power turbine 18B to a shaft 24 that is in driving engagement with the load 12, while providing a reduction speed ratio therebetween. Although a reduction gearbox is discussed in the exemplary embodiments herein, the skilled reader will appreciate that the present teachings are not limited to reduction gearboxes.

The reduction gearbox 20 allows the load 12 to be driven at a given speed, which is different than the rotational speed of the low-pressure turbine 18B. The reduction gearbox 20 allows both the load 12 and the low-pressure turbine 18B to rotate at their respective optimal speed which are different. In the embodiment shown, the reduction gearbox 20 is axially mounted at the front end of the engine 10.

For lubrication purpose, the gas turbine engine 10 includes a lubrication system S that is fluidly connected to the reduction gearbox 20 via suitable connections, such as via pipes S', hoses, and the like. As described herein below with reference to FIG. 5, the lubrication system S may be used to supply oil to create a film of lubricant between static and rotating parts of the reduction gearbox 20.

Now referring to FIGS. 1-4, the reduction gearbox 20 comprises a gear train 30 of the planetary type, also known as planetary gear train, epicyclic gear train, epicyclic gearbox, etc, but referred to as a gear train 30 herein for clarity. It is understood that the gear train may have an epicyclic configuration or a star-type epicyclic configuration depending of which component of the gear train is the input, which is the output, and which is held stationary.

The gear train 30 has a sun gear 32 mounted on a sun gear connector 34 configured to be connected to a layshaft 22a (FIG. 2) that is connected the low-pressure shaft 22. In an alternate embodiment, the sun gear 32 is mounted directly onto the layshaft 22a that is connected to the low-pressure shaft 22. The layshaft 22a, also known as a torque shaft, is configured to allow flexibility from deflection or from other contributor between the turbine section 18 and the reduction gearbox 20. In operation, the layshaft 22a is designed to twist along its rotational axis by a certain amount. The twist of the layshaft 22a may be monitored to indicate the actual torque that it transmits. The gear train 30 further has a set of planet gear assemblies 36 rotatably mounted on shafts 38—three planet gear assemblies 36 are shown, although the gear train 30 could have two or more planet gear assemblies 36. In the embodiment shown, all shafts 38 of the set of planet gear assemblies 36 are connected to a planet carrier 40, the planet gear assemblies 36 rotating onto the shafts 38. In a particular embodiment, the gear train 30 comprises a plurality of planet gear assemblies 36. At least some of the plurality of assemblies 36 are mounted on the planet carrier 40, while others may simply rotate while not being connected to the planer carrier 40. In the illustrated embodiment, bearings 42 are disposed between the shafts 38 and the planet gear assemblies 36. The bearings 42 are shown as plain oil film bearings. In the illustrated embodiment, the planet carrier 40 has a connector 44 adapted to be coupled to the shaft 24 of the load 12. Alternatively, the planet carrier 40 may be mounted directly to the shaft 24. In an alternate embodiment, the planet carrier 40 is a zero-twist carrier to reduce twist deflection under torque by driving the planet gear assemblies 36 from an axial position corresponding to a symmetry plane of the planet gear assemblies 36. In a particular embodiment, the zero-twist carrier is as described in U.S. Pat. No. 6,663,530 which is incorporated herein by reference in its entirety. Alternatively, radial stiffness of the shaft 38 may be varied along its axis to reduce the deflection that is transmitted to the planet gear assemblies 36.

Figure 4:
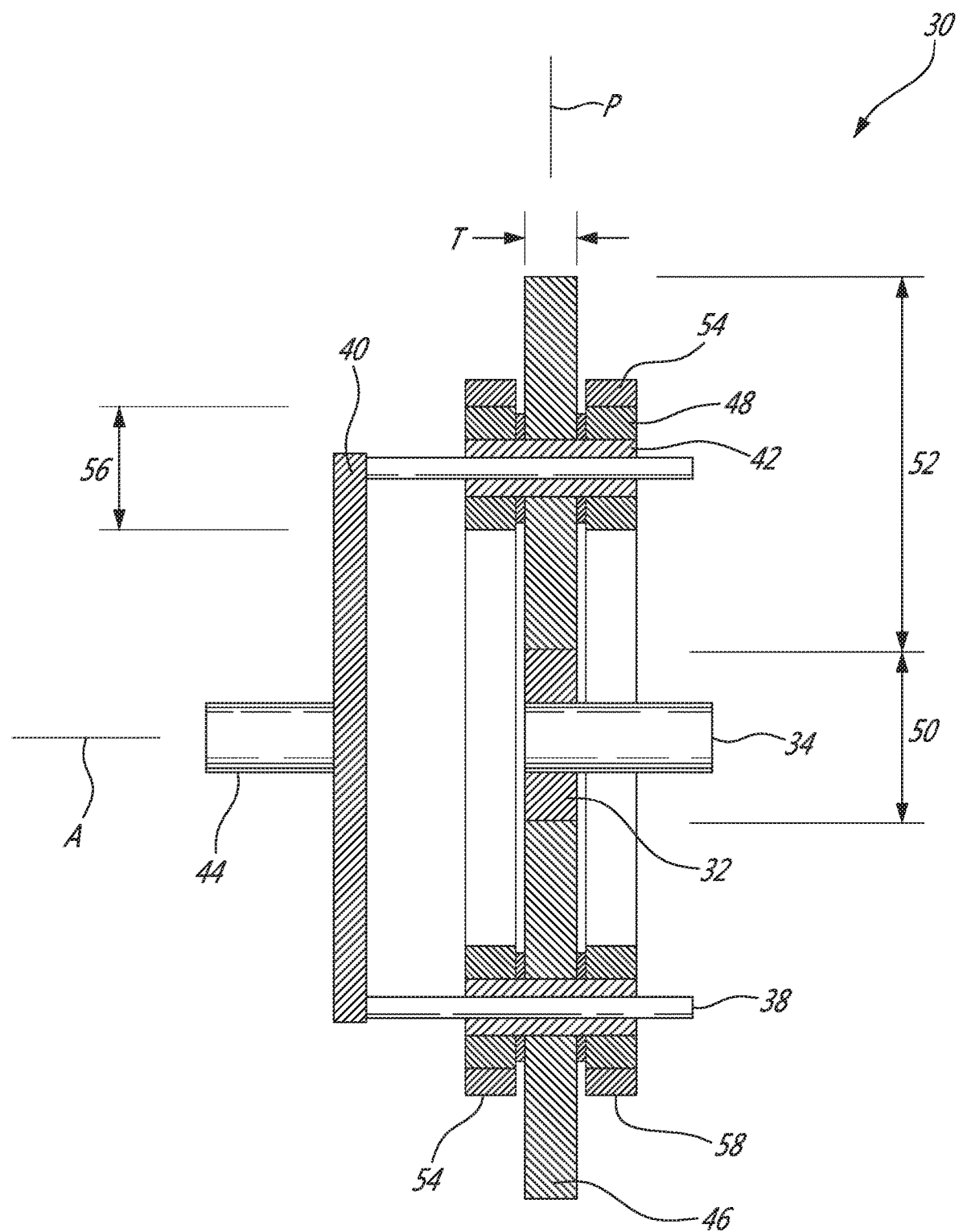
FIG. 4 is a schematic cross-sectional view along line 4-4 of the gear train of FIG. 3.

Each planet gear assembly 36 has a main gear 46, fore and aft lateral gears 48 disposed on opposite sides of the main gear 46. The fore and aft lateral gears 48 rotate integrally with the main gears 46. The main gears 46 are meshed with the sun gear 32. In the illustrated embodiment, the main gears 46 and the sun gear 32 are spur gears, but other types of gears may be used, such as helical gears. In the embodiment shown, a diameter 50 of the sun gear 32 is inferior to a diameter 52 of the main gears 46 to create a first rotational speed ratio to the gear train 30, between the sun gear 32 and the main gears 46 of the planet gears assemblies 36. As shown in FIGS. 4 and 5, the main gear 46 and the fore and aft lateral gears 48 may share a common one of the plain bearing 42. Accordingly, in the set up shown in the figures, the presence of multiple gears on the same shaft 38 may result in a longer plain bearing than for prior art planetary gearboxes.

Ring gears 54 are meshed with the fore and aft lateral gears 48 of the planet gears assemblies 36. The ring gears 54 consist of two halves and are disposed symmetrically on each side of the main gears 46 so that the reaction load on the bearings 42 is equalised along their longitudinal axis. The gears 48 and 54 may be spur gears (internal spur gear in the case of the ring gear 54). In the illustrated embodiment, the lateral gears 48 and the ring gears 54 are helical gears. Helical gears may be quieter. In a particular embodiment, teeth of the fore lateral gear are angled in an opposite way relative to teeth of the aft lateral gear such that the fore and aft lateral gears are mirrored relative to one another. In operation, the main gears 46 of such a particular embodiment self-center under torque relative to the sun gear 32. This may enhance the load sharing between the ring gears 54. In the embodiment shown, a diameter 56 of the lateral gears 48 is inferior to the diameter 52 of the main gears 46. Accordingly, a second rotational speed ratio between the planet gear assemblies 36 and the ring gears 54, or between the planet gears assemblies 36 and the planet carrier 40, is generated in the gear train 30.

The gear train 30 provides a rotational speed ratio between the sun gear 32 and the planet carrier 40 that could require at least two conventional gear trains to achieve. In a particular embodiment, less moving parts are required which may lead to cost and weight reduction of the gas turbine engine 10. Furthermore, the moving parts of such gearbox require lubrication. By having fewer parts, less oil may be required. This may reduce the capacity of the required oil system and, because less heat is generated, the size of the required heat exchanger used to cool down the oil of the reduction gearbox 20 may be reduced. In a particular embodiment, a total length of the gas turbine engine 10 may be reduced by having the gear train 30 as described herein instead of at least two conventional gear trains disposed in series to achieve a speed reduction ratio equivalent to the one of the gear train 30.

Figure 2:
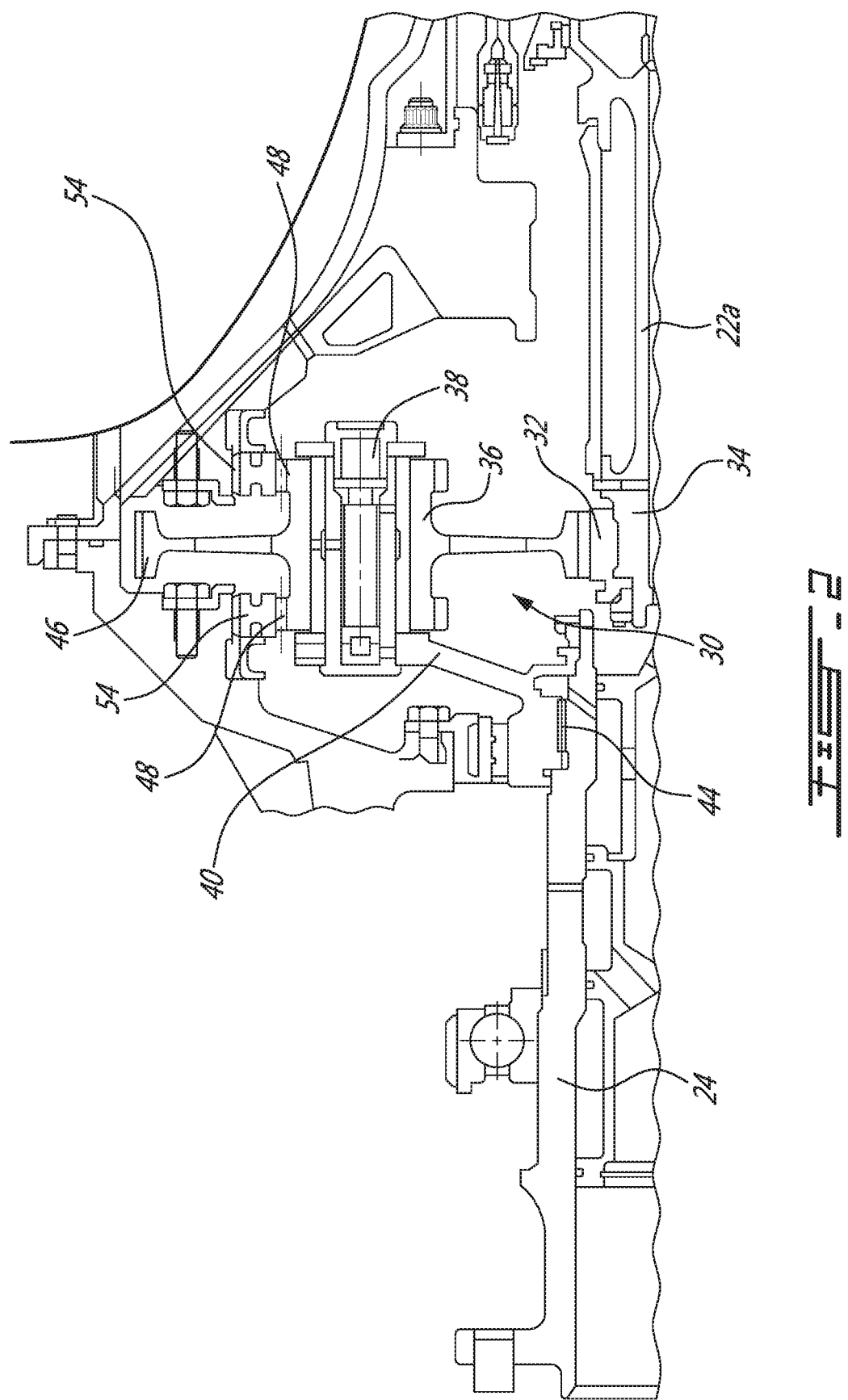
FIG. 2 is a schematic cross-sectional view of a portion of the gas turbine engine illustrating a gear train.
Figure 3:
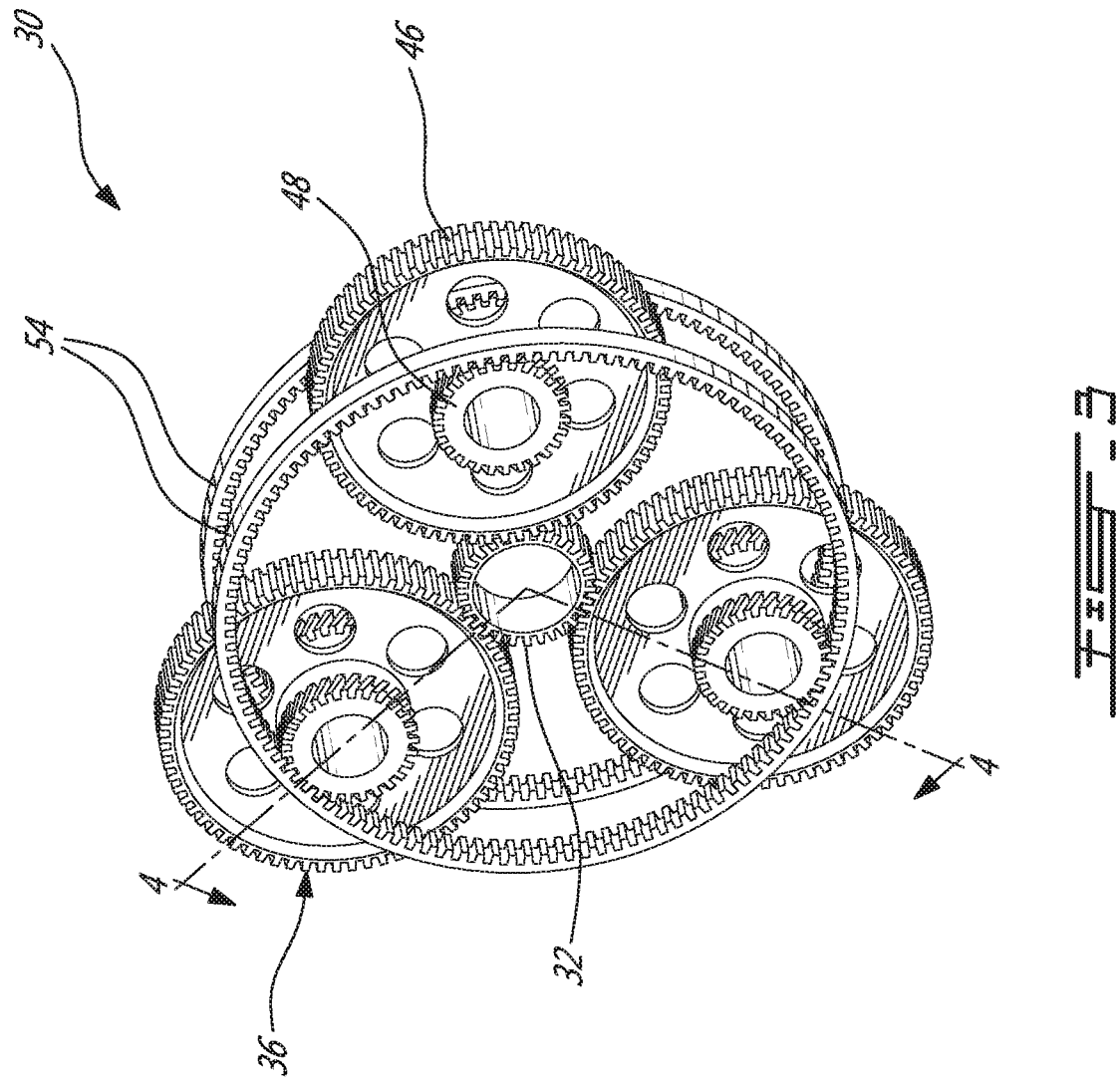
FIG. 3 is a schematic tri-dimensional view of the gear train of FIG. 2.

In the illustrated embodiment, the turbine shaft 22 is connected to the sun gear 32. The propeller shaft 24 is connected to the connector 44 of the planet carrier 40, for instance by spline connection. In such an embodiment, corresponding to a planetary arrangement, rotation of the ring gears 54 is limited, preferably blocked, as the ring gears 54 are fixed to a structure of the gas turbine engine 10 as shown in FIG. 2. It is understood that limiting rotation of the ring gears 54 comprises completely blocking the rotation of said ring gears. The speed reduction ratio is defined as the rotational speed of the shaft 22 over the rotational speed of the shaft 24. Such an embodiment provides the highest speed reduction ratio and the highest torque increase between the shafts 22 and 24 that is possible to achieve with the gear train 30. In this arrangement, the shafts 22 and 24 rotate in the same direction relative to one another.

In an alternate embodiment, a star arrangement may be used. In a star arrangement, rotation of the planet carrier 40 is limited and the propeller shaft 24 is operatively connected to the ring gears 54. It is understood that limiting rotation of the planet carrier 40 comprises completely blocking the rotation of said carrier. In this alternate embodiment, the ring gears 54 are both mounted and linked to the propeller shaft 24. The total speed reduction ratio of the star arrangement would be less than the speed reduction ratio of the fixed configuration of the ring gears 54 as described above. In this alternate embodiment, the propeller shaft 24 and the turbine shaft 22 rotate in opposite directions.

By having two ring gears 54 disposed on opposite sides of the main gears 46 the load is symmetrically distributed relative to a plane P, to which an axis of rotation A of the sun gear 32 is normal, the plane P being located half way through a thickness T of the main gears 46. By symmetrically distributing the load, the gear train may be adapted to withstand higher torques and may be adapted to use plain bearings instead of heavier and more expensive rolling element bearings.

The gear train 30 may be used in a plurality of applications, other than gas turbine engines, in which a rotational speed ratio between two rotating components is required. In such an embodiment, an input is provided to one of the sun gear 32, the planet carrier 40, and the ring gears 54 and an output is connected to another one of the sun gear 32, the planet carrier 40, and the ring gears 54. Rotation of a remaining one of the sun gear 32, the planet carrier 40, and the ring gears 54, that is not connected to the input or the output, is limited. In an embodiment, the input is the sun gear 32, the output is the planet carrier 40, and rotation of the ring gears 54 is blocked. According to another embodiment, the input is the sun gear 32, the output is the ring gears 54, and rotation of the planet carrier 40 is blocked. Suitable means are used for transmitting rotation of the ring gears 54 to the shaft 24. Other configurations are contemplated.

The gear train 30 is adapted to change a rotational speed of a rotating component relative to another rotating component. In the illustrated embodiment, the rotating component is the low-pressure shaft 22 and the other rotating component is the shaft 24. In the illustrated embodiment, the shaft 24 is connected to the load 12, but it may be connected to any other suitable component such as, but not limited to, a helicopter rotor, or an accessory of the gas turbine engine 10.

To change the rotational speed of the shaft 24 relative to the shaft 22, the gear train 30 first receives a torque of the low-pressure shaft 22 via the sun gear 32. Then, the torque is transmitted to main gears 46 of a set of planet gear assemblies 36 meshed with the sun gear 32. Each planet gear assembly 36 of the set of planet gear assemblies 36 comprises aft and fore lateral gears 48 disposed on opposite sides of the main gear 46. In the illustrated embodiment, a first rotational speed ratio is generated by having a diameter 50 of the sun gear 32 inferior to a diameter 52 of the main gears 46.

The torque is then transmitted from the fore and aft lateral gears 48 to one of the planet carrier 40 and the ring gears 54 meshed with the fore and aft lateral gears 48, while another one of the planet carrier 40 and the ring gears 54 is fixed so as not to rotate. A second rotational speed ratio is generated by having the diameter 56 of the fore and aft lateral gears 48 inferior to the diameter 52 of the main gear 46. A third rotational speed ratio is generated by the interaction of the fore and aft lateral gears 48 with the ring gears 54. The diameters 50, 52, and 56 and/or other gear parameters may be tuned to achieve the desired reduction ratio. Parameters of the diameter of the ring gears 54 may be tuned to achieve the desired reduction ratio. Herein, gear parameters is understood to mean any parameters known in the art, such as, tooth count, tooth pitch, and so on.

Referring now also to FIG. 5, only one of the planet gear assemblies 36 and bearings 42 is described herein below using the singular form. However, it is understood that the below description may apply to two or more (e.g., all) of the planet gear assemblies 36 and bearings 42 of the gearbox 20.

The bearing 42 is a journal bearing that may include a sleeve 60 and a journal 62, also referred to as a journal shaft. The sleeve 60 may be used to form one surface of the journal bearing. The sleeve 60 may be disposed radially outwardly to the journal 62 relative to a rotation axis A' of the planet gear assembly 36 defined by the shaft 38. Both of the sleeve 60 and the journal 62 are disposed around the shaft 38. In the embodiment shown, the sleeve 60, if present, is tight fitted inside the planet gear assembly 36 (or force fitted, press fitted, secured, etc). Accordingly, the sleeve 60 rotates concurrently with the planet gear assembly 36, i.e., the gears 46 and 48. The sleeve 60 may be coated at its internal diameter, where it interfaces with the journal 62 to create the journal bearing 42.

The lubrication system S (FIG. 1) is used to inject a flow F of lubricant within an annular gap G disposed radially between the sleeve 60 and the journal 62 relative to the axis A'. In the embodiment shown, the lubrication system S injects the lubricant via a first conduit 38a and a second conduit 36a. The first conduit 38a extends axially within the shaft 38 and has an inlet 38b in fluid flow communication with the lubrication system S. The first conduit 38a may have an outlet 38c in fluid flow communication with an inlet 36b of the second conduit 36a. The second conduit 36a extends through the journal 62, from a radially inner face 62a to a radially outer face 62b thereof. The inlet 36b may be an annular space to which the outlet 38c opens. The second conduit 36a has an outlet 36c that is radially outward of the second conduit inlet 36b. The second conduit inlet and outlet 36b, 36c may be located at the journal's radially inner and outer surfaces 62a, 62b, respectively. The second conduit 36a opens to the gap G between the sleeve 60 and the journal 62. In operation, the lubrication system S supplies the gap G with lubricant under pressure to allow the formation of a pressurized film of lubricant between the journal 62 and the sleeve 60. The journal 62 may float relative to the sleeve 60 by way of the film of lubricant in the gap G.

In the depicted embodiment, to accommodate the fore and aft lateral gears 48 as well as the main gear 46, an axial length L of the planet gear results in a journal bearing 42 supporting the planet gear assembly 36 is more than that of a journal bearing supporting a planet gear of a conventional planetary gearbox. Moreover, in a particular embodiment, the axial length L has to be greater than a sum of axial lengths of the fore and aft lateral gears 48 and of the main gear 46 because an axial distance between teeth of both the fore and aft lateral gears 48 and teeth of the main gear 46 is preferably maintained to allow a cutting tool to machine the teeth.

The increased length of the disclosed journal bearing 42 compared to that of conventional planetary gearbox journal bearings induces a load concentration at axial extremities of the journal bearing 42. In a particular embodiment, the load concentration at the axial extremities is such that the film of lubricant is not able to sustain the pressure which may lead to distress. This load concentration may be caused by the increased stiffness created by the cooperation of the fore and aft lateral gears 48 with the ring gears 54. In other words, the fore and aft lateral gears 48 combined with the ring gears 54 may cause the gear assembly 36 to be stiff at the axial extremities.

Accordingly, undercuts may be defined in the planet gear assembly 36 to increase compliance of such an assembly to loads. However, a radial thickness of the planet gear assembly 36, at a location where the fore and aft lateral gears 48 are meshed with the ring gears 54, is preferably kept above a certain value to have sufficient material to machine teeth of the fore and aft lateral gears 48. Furthermore, the radial thickness may have to be kept above a certain value to be able to withstand the load imparted to the fore and aft lateral gears 48. Thus, for the disclosed gearbox 30, it may not be possible to add the undercuts at the ends of the planet gear assembly 36.

Increasing a diameter of the fore and aft lateral gears 48 to maintain this radial thickness and allow undercuts to be machined may also not be a viable option as it would change the speed ratio imparted by the gearbox 30. Alternatively, increasing the diameter of the gears 48 to maintain this radial thickness might not be a viable option as it might result in a larger gear train envelope diameter, which may not be an option for all gas turbine engines.

Still referring to FIG. 5, in view of the above, undercuts 64a, 64b are located at the journal 62 of the journal bearing 42. In the embodiment shown, the journal bearing 62 defines two undercuts 64a, 64b configured for allowing radial compliance or flexibility to the journal bearing 42. Each of the two undercuts 64a, 64b is located at a respective one of journal first and second axial end faces 62c, 62d. Each of the two undercuts 64a, 64b defines an annular channel C circumferentially extending around the rotation axis A' of the planet gear assembly 36. The first undercut 64a extends from the first axial end face 62c toward the second axial end face 62d. The second undercut 64b extends from the second axial end face 62d toward the first axial end face 62c. In the depicted embodiment, the two undercuts 64a, 64b are symmetrical relative to one another about the plane P disposed axially at equal distance from the two axial end faces 62c, 62d. A vector of the axis of rotation A' is normal to the plane P. The plane P is a mid-plane of the main gear 46. However, the two undercuts 64a and 64b may not be symmetrical relative to one another.

Each of the two undercuts 64a, 64b has a height H at the axial end faces 62c, 62d. The height H is defined radially relative to the axis A'. A depth D is defined axially relative to the axis A'. The height H and the depth D are selected such that the stiffness of the journal bearing 42 to radial loads is adjusted on the axis A' defined by the shaft 38 to make it compliant to journal bearing forces so that that the resultant journal bearing load may be better distributed along the axis A' as compared to a configuration lacking such undercuts 64a, 64b. This may result in the continuous inward tapering shape or in any other appropriate shape.

In the embodiment shown, a ratio of the height H over the depth D ranges from 0.2 to 1.0. Preferably, the height H over depth D ratio H/D ranges from 0.35 to 0.5. In the embodiment shown, a height H over length L ratio H/L ranges from 0.02 to 0.2, preferably from 0.05 to 0.1. In the illustrated embodiment, a depth D over length L ratio D/L ranges from 0.1 to 0.3, preferably from 0.15 to 0.2.

To determine the depth D and height H of the undercuts 64a, 64b such that the journal bearing 42 may be used in all engine operating conditions and may meet the durability requirements, an iterative method may be used. The method includes defining a geometry for the journal bearing 42 including the planet gear assembly 36 and the shaft 38 based on the requirements. A numerical model of this geometry is prepared using Finite Element Method (FEM). The method may further include analyzing both journal and planet deformation compliance and consequently optimize geometry. The compliance, which corresponds to the inverse of the stiffness, is calculated on the geometry at each point of the journal bearing 42. The calculated compliances are stored in a combined compliance matrix. Herein, "combined" implies that the matrix takes into consideration stiffness of both the shaft and the planet. An ElastoHydroDynamic (EHD) analysis is performed to calculate lubricant film distribution (film thickness, pressure, temperature, flow, etc). Based on the results of the EHD analysis, the geometry is modified to optimize the lubricant film parameters. The steps described above are repeated until the journal bearing 42 is matched to the planet gear assembly 36.

In a particular embodiment, the disclosed gear train 30 having two ring gears 54 may create a more equal longitudinal load distribution and may enable the use of the journal bearing.

Referring now to FIG. 6, another embodiment of a gear train is generally shown at 130. The gear train 130 shown in FIG. 6 may be referred to as a star-type planetary gear train. In the embodiment shown in FIG. 6, the planet carrier 40 is fixed such that it does not rotate and the ring gears 154 are rotatable. In other words, the output of the gear train 130 is the ring gears 154. The gear train 130 further includes a ring gear connector 70 configured for mechanically linking the ring gears 154 to the shaft 24.

Each of the ring gears 154 includes a geared section 154a in meshing engagement with a respective one of the fore and aft lateral gears 48 and a connector sections 154b. The connector sections 154b are secured to the geared sections 154a and extend radially away therefrom. In the embodiment shown, the geared and connector sections 154a, 154b are monolithic. Other configurations are contemplated.

The ring gear connector 70 has a proximal end 70a secured to the shaft 24 via the connector 44. The ring gear connector 70 has a distal end 70b that is securable to the ring gears 154. More specifically, each of the connector sections 154b of the ring gears 154 has a distal end relative to a distance from the fore and aft lateral gears 48. The distal ends are secured to the distal end 70b of the ring gear connector 70.

As shown in FIG. 6, an assembly of the connector sections 154b of the ring gears 154 has an inverted U-shape to allow passage of the main gear 46 such that teeth of the main gears 46 are free of contact with the connector sections 154b of the ring gears 154.

In the embodiment shown, the ring gear connector 70, and the connector sections 154b of the ring gears are annular and extend circumferentially all around the axis of the shaft. Other configurations are contemplated without departing from the scope of the present disclosure.

Embodiments disclosed herein include:

A. A planetary gear train for an aircraft engine, comprising: a sun gear; planet gear assemblies having main gears meshed with the sun gear, fore lateral gears and aft lateral gears disposed on opposite sides of the main gears and rotating therewith; journal bearings rotatably supporting the planet gear assemblies for rotation about rotation axes, gaps defined between the journal bearings and the planetary gear assemblies; a planet carrier supporting the journal bearings; a fore ring gear meshed with the fore lateral gears; an aft ring gear meshed with the aft lateral gears; and a lubrication system extending within the planet carrier and hydraulically connected to the gaps between the journal bearings and the planet gear assemblies.

B. An aircraft engine comprising a shaft drivingly engaged to a load via a planetary gear train, the planetary gear train having a sun gear, planet gear assemblies including main gears meshed with the sun gear, fore lateral gears and aft lateral gears disposed on opposite sides of the main gears and rotating therewith, journal bearings rotatably supporting the planet gear assemblies for rotation about rotation axes, gaps defined between the journal bearings and the planetary gear assemblies, a planet carrier supporting the journal bearings, a fore ring gear meshed with the fore lateral gears, an aft ring gear meshed with the aft lateral gears, the shaft drivingly engaged to one of the sun gear, the planet carrier, and the fore and aft ring gears, the load drivingly engaged to another one of the sun gear, the planet carrier, and the fore and aft ring gears, and rotation of a remaining one of the sun gear, the planet carrier, and the fore and aft ring gears being limited, the gaps between the journal bearings and the planet gear assemblies hydraulically connected to lubricant conduits of the planetary gear train.

Embodiments A and B may include any of the following elements, in any combinations:

Element 1: the planet carrier includes shafts secured to the planet carrier, the journal bearings fixedly mounted on the shafts, the shafts defining shaft conduits of the lubrication system, the shaft conduits having shaft conduit outlets hydraulically connected to the gaps. Element 2: the shaft conduits extend along an entirety of an axial length of the journal bearings relative to their respective rotation axes. Element 3: the shaft conduit outlets and the journal conduits are axially centered between opposed axial end faces of the journal bearings relative to the axial length of the journal bearings. Element 4: the journal bearings define journal conduits extending from inner faces of the journal bearings to outer faces thereof, the journal conduits having journal conduit inlets connected to the shaft conduit outlets and journal conduit outlets opening to the gaps. Element 5: the lubrication system includes journal conduits extending between inner faces of the journal bearings and outer faces thereof, the journal bearings defining each an annular space extending from the inner faces toward the outer faces, the annular spaces extending circumferentially all around the rotation axes, journal conduits inlets of the journal conduits being in fluid flow communication with the annular spaces. Element 6: the journal bearings are symmetrical about a plane normal to the rotation axes, the main gears being centered on the plane. Element 7: sleeves secured to the planet gear assemblies, the gaps located between the sleeves and the journal bearings. Element 8: a diameter of the main gears is different than that of the fore and aft lateral gears. Element 9: the diameter of the main gears is greater than that of the fore and aft lateral gears. Element 10: sleeves mounted to the planet gear assemblies, the gaps located between the sleeves and the journal bearings. Element 11: the journal bearings are fixedly mounted on shafts secured to the planet carrier, the lubricant conduits including shaft conduits extending within the shafts. Element 12: the shaft conduits extend along an entirety of a length of the journal bearings. Element 13: the shaft conduits define shaft conduit outlets in fluid flow communication with the gaps, the shaft conduit outlets being apertures extending radially through the shafts relative to the rotation axes. Element 14: the shaft conduit outlets are centered between axially opposed end faces of the journal bearings. Element 15: the lubricant conduits include journal conduits extending from inner faces to outer faces of the journal bearings, the journal conduits having journal conduit inlets circumferentially aligned with the shaft conduit outlets and journal conduit outlets opening to the gaps. Element 16: the journal conduits are axially centered between the opposed axial end faces of the journal bearings relative to the length of the journal bearings. Element 17: annular spaces extending from the inner faces to the outer faces of the journal bearings, the annular spaces extending circumferentially all around the rotation axes and are centered between the opposed axial end faces of the journal bearings, the shaft conduit outlets hydraulically connected to the journal conduit inlets via the annular spaces. Element 18: each of the shaft conduits include at least two shaft conduit outlets and each of the journal bearings include at least two journal conduits each hydraulically connected to a respective one of the at least two shaft conduit outlets.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A planetary gear train for an aircraft engine, comprising: a sun gear; planet gear assemblies having main gears meshed with the sun gear, fore lateral gears and aft lateral gears disposed on opposite sides of the main gears and rotating therewith; journal bearings rotatably supporting the planet gear assemblies for rotation about rotation axes, gaps defined between the journal bearings and the planetary gear assemblies; a planet carrier supporting the journal bearings; a fore ring gear meshed with the fore lateral gears; an aft ring gear meshed with the aft lateral gears; and a lubrication system extending within the planet carrier and hydraulically connected to the gaps between the journal bearings and the planet gear assemblies, the lubrication system including a journal conduit extending between an inner face of at least one of the journal bearings and an outer face thereof, the at least one of the journal bearings defining an annular space extending from the inner face toward the outer face, the annular space extending circumferentially around the rotation axes, a journal conduit inlet of the journal conduit being in fluid flow communication with the annular space, the annular space located radially inwardly of the journal conduit inlet.

2. The planetary gear train of claim 1, wherein the planet carrier includes shafts secured to the planet carrier, the journal bearings fixedly mounted on the shafts, the shafts defining shaft conduits of the lubrication system, the shaft conduits having shaft conduit outlets hydraulically connected to the gaps.

3. The planetary gear train of claim 2, wherein the shaft conduits extend along an entirety of an axial length of the journal bearings relative to their respective rotation axes.

4. The planetary gear train of claim 3, wherein the shaft conduit outlets and the journal conduits are axially centered between opposed axial end faces of the journal bearings relative to the axial length of the journal bearings.

5. The planetary gear train of claim 2, wherein the journal bearings define journal conduits extending from inner faces of the journal bearings to outer faces thereof, the journal conduits having journal conduit inlets connected to the shaft conduit outlets and journal conduit outlets opening to the gaps.

6. The planetary gear train of claim 1, wherein the journal bearings are symmetrical about a plane normal to the rotation axes, the main gears being centered on the plane.

7. The planetary gear train of claim 1, comprising sleeves secured to the planet gear assemblies, the gaps located between the sleeves and the journal bearings.

8. The planetary gear train of claim 1, wherein a diameter of the main gears is different than that of the fore and aft lateral gears.

9. The planetary gear train of claim 8, wherein the diameter of the main gears is greater than that of the fore and aft lateral gears.

10. An aircraft engine comprising a shaft drivingly engaged to a load via a planetary gear train, the planetary gear train having a sun gear, planet gear assemblies including main gears meshed with the sun gear, fore lateral gears and aft lateral gears disposed on opposite sides of the main gears and rotating therewith, journal bearings rotatably supporting the planet gear assemblies for rotation about rotation axes, sleeves mounted to the planet gear assemblies, gaps defined between the journal bearings and the sleeves, a planet carrier supporting the journal bearings, a fore ring gear meshed with the fore lateral gears, an aft ring gear meshed with the aft lateral gears, the shaft drivingly engaged to one of the sun gear, the planet carrier, and the fore and aft ring gears, the load drivingly engaged to another one of the sun gear, the planet carrier, and the fore and aft ring gears, and rotation of a remaining one of the sun gear, the planet carrier, and the fore and aft ring gears being limited, the gaps between the journal bearings and the planet gear assemblies hydraulically connected to lubricant conduits of the planetary gear train, the lubricant conduits extending radially across the journal bearings.

11. The aircraft engine of claim 10, wherein the journal bearings are fixedly mounted on shafts secured to the planet carrier, the lubricant conduits including shaft conduits extending within the shafts.

12. The aircraft engine of claim 11, wherein the shaft conduits extend along an entirety of a length of the journal bearings.

13. The aircraft engine of claim 12, wherein the shaft conduits define shaft conduit outlets in fluid flow communication with the gaps, the shaft conduit outlets being apertures extending radially through the shafts relative to the rotation axes.

14. The aircraft engine of claim 13, wherein the shaft conduit outlets are centered between axially opposed end faces of the journal bearings.

15. The aircraft engine of claim 14, wherein the lubricant conduits include journal conduits extending from inner faces to outer faces of the journal bearings, the journal conduits having journal conduit inlets circumferentially aligned with the shaft conduit outlets and journal conduit outlets opening to the gaps.

16. The aircraft engine of claim 15, wherein the journal conduits are axially centered between the opposed axial end faces of the journal bearings relative to the length of the journal bearings.

17. The aircraft engine of claim 16, comprising annular spaces extending from the inner faces to the outer faces of the journal bearings, the annular spaces extending circumferentially all around the rotation axes and are centered between the opposed axial end faces of the journal bearings, the shaft conduit outlets hydraulically connected to the journal conduit inlets via the annular spaces.

18. The aircraft engine of claim 17, wherein each of the shaft conduits include at least two shaft conduit outlets and each of the journal bearings include at least two journal conduits each hydraulically connected to a respective one of the at least two shaft conduit outlets.

19. The aircraft engine of claim 10, wherein at least one of the lubricant conduits is intersected by a symmetry plane of a corresponding one of the journal bearings, the symmetry plane normal to the rotation axes.

* * * * *